United States Patent [19]
Wick et al.

[11] 3,747,498
[45] July 24, 1973

[54] PHOTOGRAPHIC APPARATUS WITH ADJUSTING DEVICE FOR FOCUSSING AND EXPOSURE CONTROL MEANS

[75] Inventors: Richard Wick; Alfred Winkler; Wilhelm Kukuk, all of Munich, Germany

[73] Assignee: Agfa-Gevaert Aktiengesellschaft, Leverkusen, Germany

[22] Filed: Oct. 6, 1971

[21] Appl. No.: 187,072

[30] Foreign Application Priority Data
Oct. 6, 1970 Germany................... P 20 49 056.6
Dec. 16, 1970 Germany................... P 20 61 998.1
Dec. 16, 1970 Germany................... P 20 62 042.2

[52] U.S. Cl. .................................................. 95/45
[51] Int. Cl. ........................................... G03b 3/00
[58] Field of Search ...................................... 95/45

[56] References Cited
UNITED STATES PATENTS
2,994,258  8/1961  Schafer.................................. 95/45
2,983,209  5/1961  Werner.................................. 95/45
3,076,398  2/1963  Hahn..................................... 95/45
3,095,794  7/1963  Raab..................................... 95/45
3,122,079  2/1964  Hahn..................................... 95/45

Primary Examiner—Samuel S. Matthews
Assistant Examiner—Michael Harris
Attorney—Michael S. Striker

[57] ABSTRACT

A still camera or motion picture camera wherein the shutter and/or the diaphragm is adjustable in response to rotation of a ring which is installed in a circumferential groove of the lens mount. The picture taking objective is movable in the direction of the optical axis by a ring-shaped, lever-shaped or rotary knob-shaped adjusting device which is mounted on the ring for movement about a second axis which is inclined with reference to the optical axis and intersects or crosses in space with the optical axis. The adjusting device also serves to rotate the ring about the optical axis. The axial position of the objective can be changed independently of or simultaneously with angular movement of the ring, depending upon whether the adjusting device is actuated to merely rotate the ring, to merely move the objective axially or to move the objective axially while rotating the ring about the optical axis.

14 Claims, 5 Drawing Figures

PATENTED JUL 24 1973

INVENTORS
RICHARD WICK
ALFRED WINKLER
WILHELM KUKUK

BY

3,747,498

*INVENTOR*
RICHARD WICK
ALFRED WINKLER
WILHELM KUKUK

PHOTOGRAPHIC APPARATUS WITH ADJUSTING DEVICE FOR FOCUSSING AND EXPOSURE CONTROL MEANS

BACKGROUND OF THE INVENTION

The present invention relates to photographic apparatus in general, and more particularly to improvements in still cameras or motion picture cameras with several adjustable camera components. Such components may include a focusing means which serves to move the picture taking objective in the direction of the optical axis and exposure control means which includes an adjustable shutter and/or an adjustable diaphragm so that the exposure control means can furnish any one of a number of different combinations of exposure time and aperture size. Furthermore, the exposure control means may be adjustable to account for the sensitivity or speed of the film which is being used in the camera and/or to account for the guide number of a source of artificial light which is used in connection with the making of exposures in daylight or for the making of exposures in the absence of daylight. Still more particularly, the invention relates to improvements in means for adjusting several adjustable components of a still camera or motion picture camera.

In presently known photographic apparatus, the focusing means is normally adjustable by a discrete adjusting device, and one or more additional adjusting devices are provided for the shutter and/or diaphragm of the exposure control means. This is often an inconvenience to the user of the photographic apparatus because the various adjustments cannot be carried out at the same time or, if an adjusting device is capable of performing several adjustments simultaneously, the respective camera components cannot be adjusted independently of each other.

SUMMARY OF THE INVENTION

An object of the invention is to provide a photographic apparatus with a novel and improved adjusting device which can control several adjustable components in such a way that each component can be adjusted independently or that several components can be adjusted simultaneously.

Another object of the invention is to provide a still camera or a motion picture camera with a novel adjusting device for the focussing means and exposure control means.

A further object of the invention is to provide an adjusting device wherein a single member which requires manipulation by the user is capable of adjusting several adjustable components of the apparatus either simultaneously or independently of each other.

An additional object of the invention is to provide a simple, compact, rugged, inexpensive and versatile adjusting device for two or more adjustable components in a still camera or motion picture camera.

A further object of the invention is to provide a versatile adjusting device which can be manipulated by one hand so that the other hand of the user remains free for the holding of camera body and/or for actuating the release while the user need not even look at the actuating device but can denote his or her attention to the subject or scene and/or to the range finder.

The invention is embodied in a photographic apparatus which may constitute a still camera or a motion picture camera and comprises adjustable focussing means (such focusing means may be designed to move the picture taking objective in the direction of the optical axis), adjustable exposure control means (such exposure control means may include an adjustable shutter and/or an adjustable diaphragm), and an adjusting device which is operatively connected with the focusing means as well as with the exposure control means and is movable about mutually inclined first and second axes to thereby respectively adjust the focusing means and the exposure control means. One of the two axes preferably coincides with the optical axis of the picture taking objective.

The adjusting device may comprise an annular member which is rotatable about the optical axis to thereby adjust the exposure control means and is also pivotable about an axis which is normal to and intersects the optical axis to thereby adjust the focussing means. Alternatively, the adjusting device may comprise a lever which is movable about the optical axis to thereby effect one of two adjustments and which is pivotable about a second axis which may be normal to and crosses in space with the optical axis to thereby effect the other adjustment. Still further, the adjusting device may comprise a knob which is movable about the optical axis to thereby effect one of two adjustments and which is further rotatable about an axis extending substantially or exactly radially of the optical axis to thereby effect a second adjustment.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
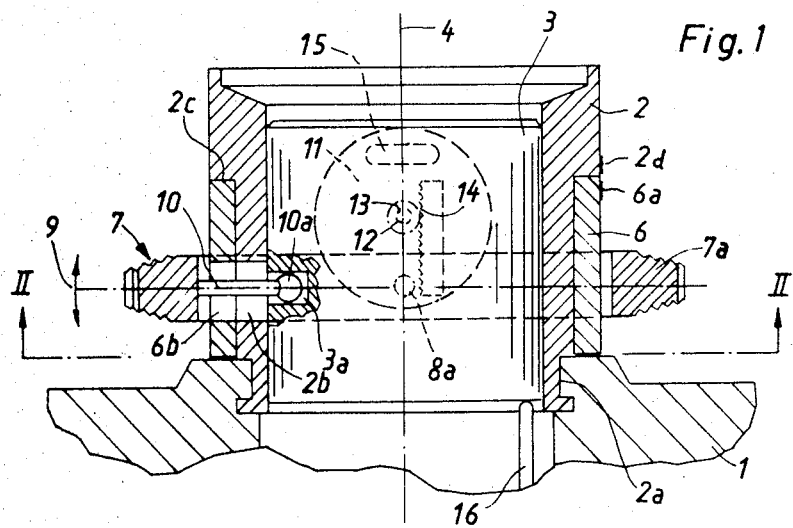
FIG. 1 is a fragmentary sectional view of a photographic apparatus wherein the adjusting device for the focusing and exposure control means is constructed and mounted in accordance with a first embodiment of the invention.
Figure 2:
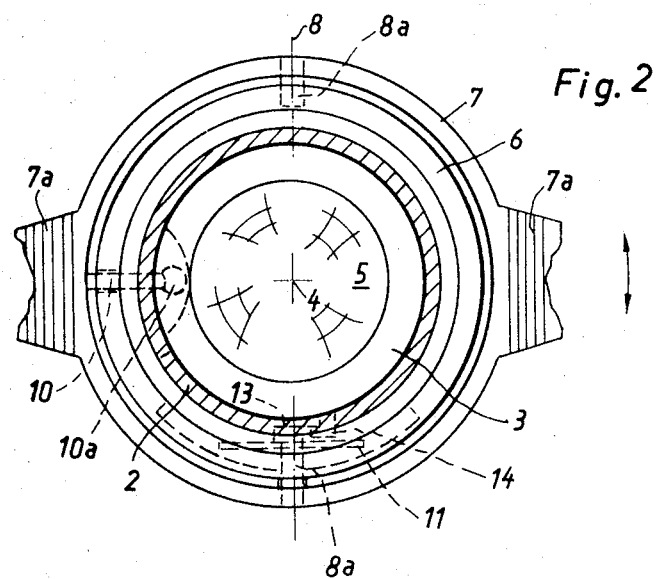
FIG. 2 is a sectional view as seen in the direction of arrows from the line II—II of FIG. 1.

Referring first to FIGS. 1 and 2, there is shown a portion of a photographic apparatus which may constitute a still camera or a motion picture camera. The apparatus comprises a body having a front wall 1 which is separably connected with a tubular lens housing or mount 2 by a quick-release coupling 2a, such as a bayonet connection. The housing 2 serves as an enclosure and as a guide for a tubular member 3 which forms part of the focusing means and supports the optical elements of a picture taking objective 5. The tubular member 3 is movable in the direction of the optical axis 4 of the objective 5 to thereby move the latter nearer to or further away from the plane of an unexposed film frame, not shown.

The lens housing 2 is provided with a circumferential groove 2c for a ring-shaped member 6 (hereinafter called ring for short) which forms part of adjustable exposure control means in the photographic apparatus. By rotating the ring 6 about the optical axis 4, the user of the camera can select a desired exposure time and/or an appropriate aperture size in a manner well known from the art of cameras and not shown in FIGS. 1 and 2. The means for indicating the angular position of the ring 6 and for thus indicating the selected adjustment of the exposure control means comprises an arcuate scale 6a which is applied to the external surface of the ring 6 and a pointer or index 2d on the adjacent portion of the lens housing 2. The scale 6a is graduated to indicate various aperture sizes and/or different exposure times. It is clear that the scale 6a can be provided on the lens housing 2 and the index 2a is then provided on the ring 6.

In accordance with a feature of the invention, the tubular member 3 of the adjustable focussing means and the ring 6 of the adjustable exposure control means can be moved, either simultaneously or independently of each other, by a novel adjusting device or selector which includes an annular adjusting member 7 surrounding with some clearance the ring 6, and a motion transmitting pin or stud 10 which is rigid with the annular member 7 and extends radially inwardly through registering slots 2b, 6b respectively provided in the lens housing 2 and ring 6. The width of the slot 6b (as considered in circumferential direction of the ring 6) need not appreciably exceed the diameter of the stud 10 and the length of the slot 2b in the lens housing 2 (as considered in the circumferential direction of the ring 6) at least equals the desired maximum angular displacement of the ring 6. The annular member 7 is coaxial with the ring 6 (at least when it assumes the neutral position shown in FIG. 1) and is pivotable about an axis 8 which is normal to and intersects the optical axis 4. This axis 8 is defined by two coaxial pivot pins 8a which are provided on or mounted in the ring 6 and are disposed diametrically opposite each other (see particularly FIG. 2). The annular member 7 can pivot about the axis 8 in directions indicated by a double-headed arrow 9 whereby the stud 10 moves lengthwise of the slot 6b, i.e., in a plane which includes the optical axis 4 and is normal to the axis 8. The slot 6b is parallel to the optical axis 4 and the arcuate slot 2b is located in a plane which is normal to the optical axis. The articulate connection between the inner end portion of the stud 10 and the tubular member 3 comprises a spherical head 10a at the innermost end of the stud and a complementary concave socket 3a in the member 3. It will be seen that the focusing means including the tubular member 3 is adjusted in response to pivoting of the annular member 7 about the axis 8 (arrow 9) because the head 10a then causes the member 3 to move axially upwardly or downwardly, as viewed in FIG. 1. The angular position of the ring 6 (and hence the adjustment of the exposure control means is changed by rotating the annular member 7 about the optical axis 4 whereby the member 7 rotates the ring 6 by way of the pivot pins 8a. Thus, the annular member 7 is movable about mutually inclined first and second axes 8 and 4 to thereby respectively adjust the focusing means (tubular member 3) and the exposure control means (ring 6). In the embodiment of FIGS. 1 and 2, the second axis 4 coincides with the optical axis of the picture taking objective 5. The tubular member 3 shares all angular movements of the ring 6 but this need not necessarily involve a change in the axial position of the objective 5, depending upon whether or not the user pivots the annular member 7 about the axis 8 while rotating the member 7 about the axis 4. If the annular member 7 is merely pivoted about the axis 8, the axial position of the tubular member 3 will change but the angular position of the ring 6 will remain unchanged. If the annular member 7 is rotated about the axis 4 without any pivoting about the axis 8, the angular position of the ring 6 will change but the axial position of the tubular member 3 will remain unchanged. Thus, the adjusting device 7, 10, 10a of FIGS. 1 and 2 can adjust the focusing means simultaneously with the exposure control means, the exposure control means can be adjusted independently of the focusing means, or the focusing means can be adjusted independently of the exposure control means. If the ring 6 serves to control a shutter, it can change the setting of a conventional retard mechanism which determines the delay with which the shutter closes following actuation of the camera release, not shown. If the ring 6 serves to adjust a diaphragm, it can be pivotally connected with a set of vanes or blades which increase or reduce the size of the light-admitting aperture in response to rotation of the ring 6 in a clockwise or in a counterclockwise direction. While pivoting the annular member 7 about the axis 8 to change the axial position of the tubular member 3 and objective 5, the user of the camera can look at a conventional range finder (not shown) in the camera body to determine the optimum axial position of the objective 5 for the making of an exposure at a given distance from the subject or scene.

An advantage of the improved adjusting device is that it allows for great simplification of manipulation of the photographic apparatus. Thus, the user of the photographic apparatus can hold the camera body with one hand while using the other hand to adjust the exposure control means and/or the focussing means. In order to further facilitate the manipulation of the improved adjusting device, the annular member 7 is provided with one, two or more outwardly extending projections 7a which may be grooved, milled or otherwise roughened to insure a satisfactory grip.

In addition to the aforementioned indicating means 6a, 2a for the angular positions of the ring 6, the photographic apparatus of FIGS. 1 and 2 is provided with a second indicating means for indicating the axial positions of the tubular member 3 and objective 5. This second indicating means comprises a disk-shaped dial 11 which is mounted in the interior of the lens housing 2 (between the lens housing 2 and the tubular member 3) and is rotatable with or on a radially inwardly extending shaft 12 of the lens housing. The graduations at the outer side of the dial 11 indicate various distances from the subject or scene, and at least one such graduation is observable in each angular position of the dial 11 through a window 15 which is provided in the lens housing 2. The means for rotating the dial 11 in response to axial displacement of the tubular member 3 and objective 5 comprises a pinion 13 on the shaft 12 and an elongated toothed rack 14 which meshes with the pinion 12 and shares axial movements of the tubular member 3. The dial 11 is preferably located in a plane which is at least substantially tangential to the peripheral surface of the tubular member 3. When the annular member 7 is pivoted about the axis 8, the axial position of the tubular member 3 is changed whereby the member 3 shifts the rack 14 in parallelism with the optical axis 4 so that the rack 14 rotates the pinion 13 which in turn rotates the dial 11 so that the latter moves an appropriate graduation into register with the window 15 in the lens housing 2. The dial 11 enables the user of the photographic apparatus to make a coarse adjustment of the focussing means prior to a final adjustment by looking at the view finder (not shown). If desired, the dial 11 or an analogous indicating means can be mounted in the viewfinder of the photographic apparatus so that, by looking into the viewfinder and by pivoting the annular member 7 about the axis 8, the user can read the selected axial position of the objective 5. The indicating means in the viewfinder can be provided in addition to the dial 11 and window 15; to this end, the apparatus of FIGS. 1 and 2 comprises a pusher 16 which is parallel to the optical axis 4 and is biased against the inner end face of the tubular member 3 by a spring (not shown) so that it shares all axial movements of the objective 5. The pusher 16 can adjust a scale which is observable in the viewfinder. It is further clear that a scale with graduations indicating various distances from the subject or scene can be provided directly on the tubular member 3 and the lens housing 2 can be provided with a window which allows for observation of appropriate graduation on the scale of the member 3 in each axial position of the objective 5. Still further, the window 15 can accommodate a magnifying lens of vitreous or synthetic plastic material to allow for more convenient reading of that graduation on the dial 11 which is in momentary register with the window.

The head 10a of the motion transmitting stud 10 is received in the socket 3a of the tubular member 3 with sufficient clearance to allow the annular member 7 to pivot about the axis 8 and to thereby change the axial position of the objective 5. If desired, the socket 3a can be replaced with a circumferential groove in the external surface of the tubular member 3 whereby such groove receives the head 10a of the stud 10 and allows the parts 6 and 7 to rotate about the axis 4 with reference to the member 3 and lens housing 2. In such photographic apparatus, the rack 14 can be rigidly connected with the tubular member 3 because the latter need not change its angular position. It is further clear that the length of the slot 2b (as considered in the circumferential direction of the ring 6) and the height of this slot (as considered in the direction of the axis 4) are sufficient to allow for unimpeded pivotal movements of the annular member 7 about the axis 8 as well as for unimpeded angular movements of the member 7 about the axis 4 within the desired range of adjustments of the parts 3 and 6.

The adjusting device including the parts 7 and 10 exhibits a number of important advantages. Thus, the user of the camera can observe the subject or scene by looking through the viewfinder while one hand suffices to adjust the objective 5 and/or the exposure control means by pivoting the member 7 about the axis 8 and/or by rotating the member 7 about the axis 4. Furthermore, the adjustment of focussing means can be completed within a very short interval of time because a single grip on the annular member 7 (e.g., on one of the projections 7a) suffices to enable the user to move the member 7 in the directions indicated by the arrow 9 and to thus move the tubular member 3 between two extreme axial positions and through an infinite number of intermediate positions. Adjustment of the ring 6 does necessitate an angular displacement of the member 7 about the optical axis; however, if necessary, such adjustment can be carried out simultaneously with adjustment of the focusing means. It was found that the manipulation of annular member 7 in order to adjust the focusing means and the exposure control means consumes only a small fraction of the time which is necessary to adjust the exposure control means by way of a first annular member and the focusing means by way of a discrete second annular member.

Figure 3:
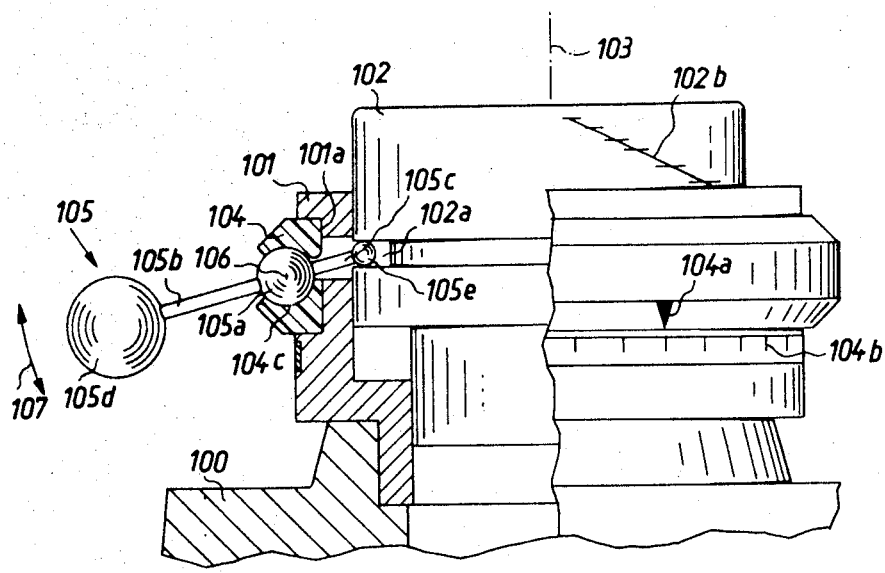
FIG. 3 is a fragmentary partly elevational and partly sectional view of a photographic apparatus embodying a modified adjusting device.

In the photographic apparatus of FIG. 3, the camera body includes a front wall 100 which is separably connected with a tubular lens mount or housing 101, e.g., by means of a conventional bayonet lock. The lens housing 101 accommodates an axially adjustable tubular member 102 which supports the picture taking objective, not shown. The optical axis of the objective is shown at 103. The tubular member 102 forms part of adjustable focussing means and the adjustable exposure control means comprises a ring 104 which is rotatable in a circumferential groove 101a of the lens housing 101. By rotating the ring 104 about the optical axis 103, the user of the photographic apparatus can adjust the shutter and/or the diaphragm of the exposure control means in a well known manner, not shown.

The adjusting device 105 for the tubular member 102 and the ring 104 of FIG. 3 is a two-armed lever which is fulcrumed in the ring 104 so as to be pivotable about an axis 106 which is normal to and crosses in space with the optical axis 103. It can be said that the axis 106 is tangential to the ring 104. The adjusting device or lever 105 has two arms 105b, 105c which extend to opposite sides of the axis 106 and substantially or exactly radially of the optical axis 103. The arms 105b, 105c of the device 105 meet in a cylindrical portion 105a which is turnable in a complementary socket 104c of the ring 104 and whose axis coincides with the axis 106. The inner end portion of the arm 105c carries a spherical head 105e which is received in a circumferential groove 102a of the tubular member 102. The outer arm 105b forms with a spherical knob 105d a handle which can be manipulated to pivot the adjusting device 105 in directions indicated by the arrow 107 (i.e., about the axis 106) and/or to move the device 105 and the ring 104 about the optical axis 103. The arm 105c and its head 105e cause the tubular member 102 and the objective to move in the direction of the optical axis 103 in response to pivoting of the adjusting device 105 about the axis 106. Such pivotal movement can be performed simultaneously with or independently of an angular movement about the optical axis 103, i.e., the focusing means can be adjusted simultaneously with or independently of the exposure control means.

The means for indicating the selected angular positions of the ring 104 comprises a scale 104b which is applied to the periphery of the lens housing 101 and an index or pointer 104a on the ring 104. The graduations of the scale 104b indicate various exposure times and/or different aperture sizes. It is clear that the positions of the scale 104b and index 104a can be reversed.

The indexing means for pointing out various axial positions of the tubular member 102 comprises a scale 102b which is applied to the periphery of the lens housing 101 and whose graduations indicate various distances from the subject or scene. The reading of the scale 102b is facilitated if its graduations are normal to the optical axis and are arranged along a helix as shown in FIG. 3. The tubular member 102 does not share the angular movements of the ring 104 about the optical axis and the ring 104 cannot share the axial movements of the tubular member 102.

The structure shown in FIG. 3 can be modified by mounting the adjusting device 105 in such a way that the axis 106 is not normal to the plane of FIG. 3. Thus, the axis 106 can remain in a plane which is tangential to the ring 104 but it can make with the optical axis 103 an oblique angle. Such mounting of the adjusting device 105 will be resorted to if it is desired to select a predetermined transmission ratio between the extent of pivotal movement of the adjusting device about the axis 106 and the extent of axial displacement of the tubular member 102. Thus, such ratio can be changed by changing the inclination of the axis 106 in a plane which is tangential to the ring 104.

It is also within the purview of the invention to mount the adjusting device 105 in such a way that the pivot axis 106 is located in a plane which is tangential to the peripheral surface or to the median diameter of the lens housing 101. Furthermore, the common axis of the arms 105b, 105c need not be exactly radial to the optical axis 103.

An advantage of the adjusting device 105 is that it occupies even less room than the adjusting device of FIGS. 1 and 2 and that the tubular member 102 need not at any time share the angular movements of the ring 104. Furthermore, if the outer arm 105b is much longer than the inner arm 105c, a relatively large displacement of the knob 105d will entail a relatively small axial displacement of the tubular member 102 so that the latter can be adjusted with a high degree of accuracy. The operative connection between the adjusting device 105 and the tubular member 102 is extremely simple and inexpensive; it merely includes the circumferential groove 102a and the spherical head 105e on the arm 105c. The provision of the cylindrical portion 105a on the adjusting device 105 renders it possible to machine the socket 104c of the ring 104 in relatively simple and readily available machinery. Furthermore, since the cylindrical portion 105a positively prevents any movements of the adjusting device 105 with reference to the ring 104 excepting about the axis 106, the user is much less likely to accidentally turn the ring 104 during axial adjustment of the tubular member 102.

It is further clear that the photographic apparatus of the present invention can be readily modified by constructing and mounting the adjusting device in such a way that a movement about the optical axis entails an adjustment of the exposure control means and that a movement about an axis which is inclined with reference to the optical axis brings about an adjustment of the focussing means.

Figure 4:
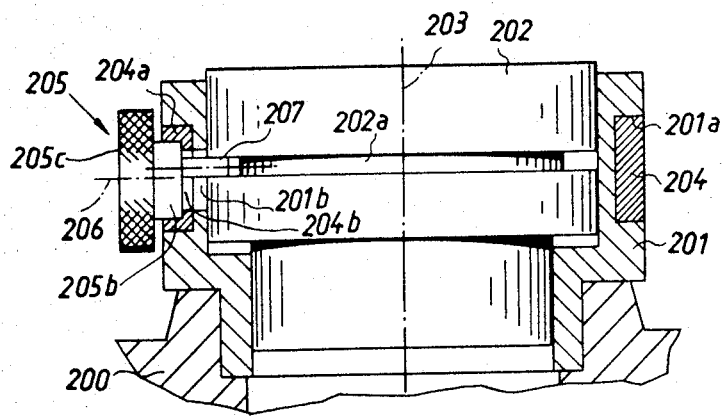
FIG. 4 is a fragmentary sectional view of a photographic apparatus which embodies a third adjusting device.
Figure 5:
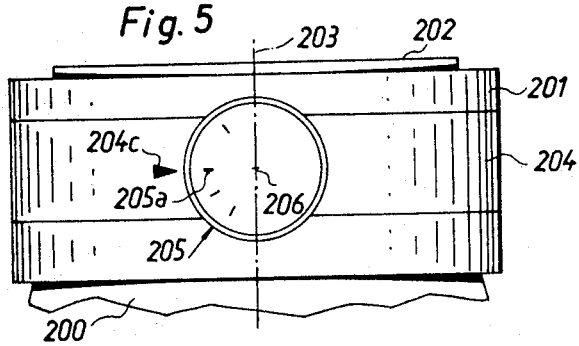
FIG. 5 is an elevational view as seen from the left-hand side of FIG. 4.

The photographic apparatus of FIGS. 4 and 5 comprises a camera body having a front wall 200 which is separably connected with a lens mount or housing 201 by a bayonet lock or the like. The picture taking objective (not shown) is mounted in a tubular member 202 which is movable in the direction of the optical axis 203 in response to rotation of a modified knob-shaped adjusting device 205 about its own axis 206 which is normal to and intersects the optical axis 203. The adjustable exposure control means comprises a ring 204 which is rotatable about the optical axis 203 and extends into a circumferential groove 201a of the lens housing 201. The adjusting device 205 has a hub 205b which is rotatable in but cannot move axially in a radial bearing sleeve 204a of the ring 204. The outer portion 205c of the adjusting device 205 is knurled or milled to facilitate its rotation by two fingers or even by a single finger. The hub 205b has a radially inwardly extending eccentric projection or pin 207 which extends through suitably dimensioned slots 204b and 201b of the ring 204 and lens housing 201 and into a circumferential groove 202a of the tubular member 202. The slot 201b extends in the circumferential direction of the ring 204 and the height of both slots (as considered in the axial direction of the tubular member 202 is sufficient to allow the adjusting device 205 to turn in the bearing sleeve 204a through an angle of at least 180° so as to move the projection 207 between an uppermost and a lowermost position, as viewed in FIG. 4, and to thus move the tubular member 202 between two extreme axial positions.

The exposure control means is adjusted in response to movement of the adjusting device 205 about the optical axis 203 because such angular movement is shared by the ring 204 which thereby adjusts the shutter and/or the diaphragm. The scale and index which indicate the angular positions of the ring 204 can be applied in the same way as shown for the scale 104b and index 104a of FIG. 3.

The focusing means for the objective is adjusted in response to rotation of the adjusting device 205 about the axis 206 because the projection 207 then causes the tubular member 202 and the objective to move in the direction of the optical axis 203. The ring 204 can be moved about the optical axis 203 to effect an adjustment of the exposure control means in dependency on the sensitivity or speed of the film which is used in the photographic apparatus. The same holds true for the ring 6 of FIGS. 1–2 and/or for the ring 104 of FIG. 3.

The outer end face of the portion 205c of the adjusting device 205 carries a scale 205a whose graduations indicate different distances from the subject or scene; such graduations can be pinpointed by an index 204c on the peripheral surface of the ring 204.

If desired, the operative connections between the adjusting device 205 and the focusing means and exposure control means can be constructed in such a way that the adjusting device will move about the optical axis 203 in order to adjust the focusing means and about the axis 206 to adjust the exposure control means.

The advantages of the adjusting device 205 are analogous to those of the adjusting lever 105 shown in FIG. 3. Thus, the device 205 occupies very little room, it allows for highly accurate adjustments of the axial position of the tubular member 202, and the operative connection between the device 205 and the parts 204, 202 is extremely simple and reliable. Moreover, it is very convenient to rotate the milled outer portion 205c while the entire adjusting device 205 is being moved about the optical axis 203 so that the user of the photographic apparatus can adjust the focusing means simultaneously with an adjustment of the exposure control means.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic camera, a combination comprising a tubular lens housing; adjustable focusing means axially movably mounted in said lens housing; adjustable exposure control means rotatably mounted in said lens housing; and an adjusting device including first motion transmitting means movably connected with said adjustable focusing means and second motion transmitting means movably connected with said adjustable exposure control means, said adjusting device being movable about the axis of said lens housing to thereby damage the position of one of said adjustable means with respect to said lens housing by way of the respective motion transmitting means and said adjusting device being further movable about a second axis normal to and intersecting the axis of said lens housing to thereby change the position of the other of said adjustable means with respect to said lens housing by way of the respective motion transmitting means.

2. A combination as defined in claim 1, further comprising a picture taking objective having an optical axis which coincides with the axis of said lens housing, said adjusting device being pivotable about said second axis to thereby move said objective in the direction of said optical axis by way of said focusing means and said adjusting device being rotatable about the axis of said lens housing to thereby adjust said exposure control means.

3. A combination as defined in claim 1, further comprising a picture taking objective having an optical axis coinciding with the axis of said lens housing, said exposure control means comprising a ring-shaped member coaxial with said lens housing and supporting said adjusting device for angular movement about said second axis, said ring-shaped member being rotatable by said adjusting device about the axis of said lens housing and said objective being movable in the direction of said optical axis by way of said focussing means in response to angular movement of said adjusting device about said second axis.

4. A combination as defined in claim 1, wherein said adjusting device further includes an annular member which is at least substantially coaxial with said lens housing.

5. A combination as defined in claim 1, further comprising a picture taking objective having an optical axis which coincides with the axis of said lens housing, said exposure control means comprising a ring-shaped member which is coaxial with said objective and is rotatable by said adjusting device about said optical axis to thereby effect the adjustment of said exposure control means, said focussing means comprising a tubular member supporting said objective and being movable in the direction of said optical axis in response to movement of said adjusting device about said second axis.

6. A combination as defined in claim 5, wherein said adjusting device further comprises an annular member which is coaxial with said objective and is pivotable about said second axis to thereby move said tubular member axially, said first motion transmitting means being articulately connected with said tubular member.

7. A combination as defined in claim 5, further comprising means for indicating various positions of said focussing means in response to movement of said adjusting device about said second axis.

8. A combination as defined in claim 7, wherein said indicating means comprises a dial supported by said lens housing between said lens housing and said tubular member and being located in a plane which is at least substantially tangential to the periphery of said tubular member.

9. A combination as defined in claim 8, further comprising means for rotating said dial in response to movement of said tubular member in the direction of said optical axis.

10. A combination as defined in claim 9, wherein said means for rotating said dial comprises a gear coaxial with and secured to said dial and a toothed rack movable with said tubular member in the direction of said optical axis and meshing with said pinion.

11. A combination as defined in claim 9, wherein said dial is provided with graduations and said lens housing comprises a window which permits observation of different graduations on said dial in different axial positions of said tubular member.

12. A combination as defined in claim 1, further comprising a picture taking objective having an optical axis coinciding with the axis of said lens housing, said exposure control means comprising a ring-shaped member which is rotatable by said adjusting device about said optical axis, said adjusting device being supported by said ring-shaped member for rotation about said second axis.

13. A combination as defined in claim 12, wherein said focusing means comprises a tubular member supporting said objective and being movable therewith in the direction of said optical axis in response to rotation of said adjusting device with reference to said ring-shaped member.

14. A combination as defined in claim 13, wherein said tubular member has a circumferential groove and said first motion transmitting means comprises an eccentric projection extending into said groove.

* * * * *